United States Patent
Liu

(10) Patent No.: US 11,243,882 B2
(45) Date of Patent: Feb. 8, 2022

(54) IN-ARRAY LINKED LIST IDENTIFIER POOL SCHEME

(71) Applicant: International Business Machines Corporation, Armonk, NY (US)

(72) Inventor: Joseph Liu, Nashua, NH (US)

(73) Assignee: International Business Machines Corporation, Armonk, NY (US)

(*) Notice: Subject to any disclaimer, the term of this patent is extended or adjusted under 35 U.S.C. 154(b) by 51 days.

(21) Appl. No.: 16/849,226

(22) Filed: Apr. 15, 2020

(65) Prior Publication Data

US 2021/0326252 A1   Oct. 21, 2021

(51) Int. Cl.
| G06F 12/00 | (2006.01) |
| G06F 13/00 | (2006.01) |
| G06F 12/06 | (2006.01) |
| G06F 16/22 | (2019.01) |
| G06F 9/50 | (2006.01) |

(52) U.S. Cl.
CPC ........ *G06F 12/0646* (2013.01); *G06F 9/5016* (2013.01); *G06F 16/2237* (2019.01); *G06F 2212/1044* (2013.01)

(58) Field of Classification Search
CPC ............. G06F 12/0646; G06F 16/2237; G06F 9/5016; G06F 2212/1044
USPC ......................................................... 711/173
See application file for complete search history.

(56) References Cited

U.S. PATENT DOCUMENTS

| 6,341,342 | B1* | 1/2002 | Thompson | G06F 3/0613 |
| | | | | 707/999.202 |
| 6,717,576 | B1* | 4/2004 | Duluk, Jr. | G06T 11/40 |
| | | | | 345/419 |
| 8,510,596 | B1* | 8/2013 | Gupta | G06F 11/1469 |
| | | | | 714/15 |
| 8,634,796 | B2* | 1/2014 | Johnson | G06Q 30/0633 |
| | | | | 455/404.1 |
| 8,897,741 | B2* | 11/2014 | Johnson | H04W 40/20 |
| | | | | 455/404.2 |
| 9,058,255 | B2* | 6/2015 | Huang | G06F 12/0246 |
| 9,081,753 | B2* | 7/2015 | Paleologu | G06F 11/2089 |

(Continued)

FOREIGN PATENT DOCUMENTS

| CN | 104601380 B | 5/2015 |
| CN | 107612731 A | 1/2018 |

(Continued)

*Primary Examiner* — Sheng Jen Tsai
(74) *Attorney, Agent, or Firm* — Yee & Associates, P.C.

(57) ABSTRACT

A scheme for managing identifier pool in computer memory is provided. A memory pool array is created within a computer memory, wherein the array reserves locations in the computer memory for use by a software application. Each location in the array represents an identifier. A start identifier and end identifier are specified for the memory pool array, wherein the start identifier specifies a starting location of the array and the end identifier specifies an end location of the array. The memory pool array is initialized by creating an in-array linked list pool of identifiers for use by the software application. An identifier is allocated from the memory pool array for use by the application and released back to the memory pool array after use by the application, wherein allocation and release are managed by a set of pool control variables in the in-array linked list pool.

20 Claims, 12 Drawing Sheets

(56) References Cited

U.S. PATENT DOCUMENTS

| | | | |
|---|---|---|---|
| 10,103,968 B2 * | 10/2018 | Hsiao | H04L 45/28 |
| 2003/0167348 A1 * | 9/2003 | Greenblat | H04L 12/42 |
| | | | 709/251 |
| 2003/0172189 A1 * | 9/2003 | Greenblat | H04L 12/433 |
| | | | 709/251 |
| 2003/0172190 A1 * | 9/2003 | Greenblat | H04L 12/4637 |
| | | | 709/251 |
| 2007/0113004 A1 * | 5/2007 | Sugimoto | G06F 3/0665 |
| | | | 711/112 |
| 2007/0165035 A1 * | 7/2007 | Duluk | G06T 15/50 |
| | | | 345/506 |
| 2007/0288718 A1 * | 12/2007 | Cholleti | G06F 12/1009 |
| | | | 711/170 |
| 2007/0288720 A1 * | 12/2007 | Cholleti | G06F 9/52 |
| | | | 711/202 |
| 2008/0005495 A1 * | 1/2008 | Lowe | G06F 12/1081 |
| | | | 711/152 |
| 2008/0126736 A1 * | 5/2008 | Heil | G06F 12/0253 |
| | | | 711/171 |
| 2011/0218968 A1 * | 9/2011 | Liu | G06F 11/1453 |
| | | | 707/649 |
| 2011/0222552 A1 * | 9/2011 | Mital | G06F 9/4881 |
| | | | 370/412 |
| 2011/0222553 A1 * | 9/2011 | Mital | G06F 9/3851 |
| | | | 370/412 |
| 2011/0225372 A1 * | 9/2011 | Pirog | G06F 9/3885 |
| | | | 711/141 |
| 2011/0225588 A1 * | 9/2011 | Pollock | H04L 12/56 |
| | | | 718/102 |
| 2011/0225589 A1 * | 9/2011 | Pirog | G06F 9/3885 |
| | | | 718/102 |
| 2011/0246582 A1 * | 10/2011 | Dozsa | G06F 9/546 |
| | | | 709/206 |
| 2011/0265098 A1 * | 10/2011 | Dozsa | G06F 9/546 |
| | | | 719/314 |
| 2014/0281366 A1 * | 9/2014 | Felch | G06F 9/355 |
| | | | 711/207 |
| 2015/0281126 A1 * | 10/2015 | Regula | H04L 67/26 |
| | | | 709/212 |
| 2015/0296018 A1 * | 10/2015 | Dondini | H04L 45/72 |
| | | | 709/213 |
| 2018/0144019 A1 * | 5/2018 | Altaparmakov | G06F 16/16 |
| 2019/0188098 A1 * | 6/2019 | Gupta | G06F 3/067 |
| 2021/0311880 A1 * | 10/2021 | Gupta | G06F 16/13 |

FOREIGN PATENT DOCUMENTS

| | | |
|---|---|---|
| CN | 109743261 A | 5/2019 |
| CN | 109768924 A | 5/2019 |
| WO | WO2016165422 A1 | 10/2016 |

* cited by examiner

IN-ARRAY LINKED LIST IDENTIFIER POOL SCHEME

BACKGROUND

The disclosure relates generally to computing networks and more specifically to identifier management in software defined networking (SDN).

In computer memory, memory management allows the dynamic allocation of portions of memory at the request of programs and free it for reuse when no longer needed. Fulfilling an allocation request comprises locating a block of unused memory of sufficient size. A memory pool, also known as fixed-size blocks allocation, is a kernel object that allows memory blocks to be dynamically allocated from a designated memory region called a heap. The memory blocks in a memory pool can be of any size. Memory pools allow memory allocation with constant execution time and deterministic behavior on real-time systems to avoid the out-of-memory errors in which no additional memory can be allocated to programs.

To improve network monitoring and performance SDN attempts to centralize network intelligence in one network component by decoupling the forwarding process of network packets from the routing process. This decoupling allows network control to be directly programmable and the underlying infrastructure to be abstracted from applications and network services. SDN creates a control layer between the infrastructure and application programming interfaces. This control layer appears to applications and policy engines as a single logical switch. SDN is meant to address the decentralized static architecture of traditional networks by providing improved flexibility and easier troubleshooting.

SUMMARY

An illustrative embodiment provides a method for identifier management in computer memory. The method comprises creating memory pool array within a computer memory, wherein the memory pool array reserves a number of locations in the computer memory for use by a software application, and wherein each location in the memory pool array represents an identifier. A start identifier value and an end identifier value are specified for the memory pool array, wherein the start identifier value specifies a starting location of the memory pool array and the end identifier value specifies an end location of the memory pool array. The memory pool array is initialized by creating an in-array linked list pool of identifiers for use by the software application. An identifier is allocated from the memory pool array for use by the software application, and the identifier is released back to the memory pool array after use by the software application, wherein the allocation and release are managed by a set of pool control variables in the in-array linked list pool.

Another illustrative embodiment provides a system for identifier management in computer memory. The system comprises a storage device configured to store program instructions and one or more processors operably connected to the storage device and configured to execute the program instructions to cause the system to: create a memory pool array within a computer memory, wherein the memory pool array reserves a number of locations in the computer memory for use by a software application, and wherein each location in the memory pool array represents an identifier; specify a start identifier value and an end identifier value for the memory pool array, wherein the start identifier value specifies a starting location of the memory pool array and the end identifier value specifies an end location of the memory pool array; initialize the memory pool array, wherein initializing comprises creating an in-array linked list pool of identifiers for use by the software application; allocate an identifier from the memory pool array for use by the software application; and release an identifier back to the memory pool array after use by the software application, wherein allocating and releasing are managed by a set of pool control variables in the in-array linked list pool.

Another illustrative embodiment provides a computer program product for identifier management. The computer program product comprises a computer-readable storage medium having program instructions embodied thereon to perform the steps of: creating a memory pool array within a computer memory, wherein the memory pool array reserves a number of locations in the computer memory for use by a software application, and wherein each location in the memory pool array represents an identifier; specifying a start identifier value and an end identifier value for the memory pool array, wherein the start identifier value specifies a starting location of the memory pool array and the end identifier value specifies an end location of the memory pool array; initializing the memory pool array, wherein initializing comprises creating an in-array linked list pool of identifiers for use by the software application; allocating an identifier from the memory pool array for use by the software application; and releasing an identifier back to the memory pool array after use by the software application, wherein allocating and releasing are managed by a set of pool control variable in the in-array linked list pool.

DETAILED DESCRIPTION

Figure 1:
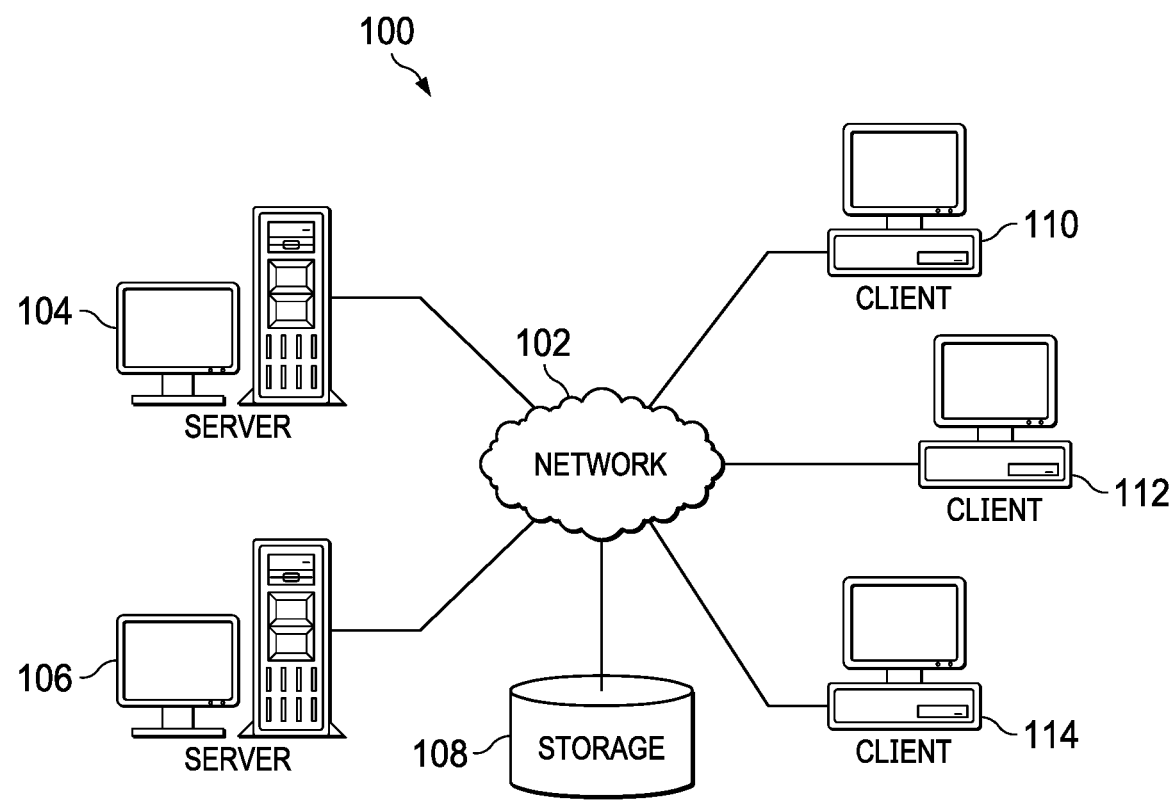
FIG. 1 depicts a pictorial representation of a network of data processing systems in which illustrative embodiments can be implemented.

The illustrative embodiments recognize and take into account one or more different considerations. The illustrative embodiments recognize and take into account that in a Software Defined Network (SDN), as in most of software programming projects, identifier management such as resource pools is one of the fundamental building blocks.

In particular, there is a need for a large number of such pools for various number such as hardware offload engine filter handlers, transmission control protocol (TCP) or user datagram protocol (UDP) ports, multiprotocol label switching (MPLS) labels, etc. As such, it is very important to have an identifier pool data structure that is both memory-space efficient and performance effective.

The illustrative embodiments recognize and take into account that there are different ways to design and implement identifier pools, each with its own trade-offs. For example, an identifier pool can be designed and implemented as a stack data structure, which allows O(1) performance for identifier allocation and release. However, such a design prevents the ability of allocating a specific identifier as requested because the stack only allows push and pop from the top.

The illustrative embodiments also recognize and take into account that an identifier pool can also be designed and implemented as a linked list data structure, which allows O(1) performance for identifier allocation and release. A doubly linked list can also allow O(1) allocating specific identifier as requested. However, the linked list implementation typically requires additional metadata to be part of the pool data structure, which requires extra memory space.

The illustrative embodiments also recognize and take into account that an identifier pool that is designed and implemented as a bitmap uses the bit position in the bitmap to represent the value of the identifier. This approach can be very efficient in memory space. It can also allow allocating specific identifier by request in O(1). However, the normal allocation and release of identifiers is a linear performance O(N).

The illustrative embodiments recognize and take into account that the capability of allocating specific identifiers by request is important to the identifier pool design where the applications require the identifier pool state recovery after application restart. For example, if an application consists of allocating identifiers from an identifier pool and uses them to program hardware (e.g., programming hardware forwarding tables in hardware offload engine), after application restart (e.g., due to software crash or software upgrade), the identifier pools maintained in the software program get re-initialized. However, as the hardware is still configured (e.g., in the offload engine forwarding table) with previously allocated identifiers and serving real-time traffic, re-initializing and configuring the hardware might introduce unnecessary interruption to the system data-path operation.

One possible recovery scheme with the identifier pools capable of allocating specific identifiers by request is to read back the identifiers programmed in the hardware table and allocating them from the re-initialized pools to build up the pool state.

In the illustrative embodiments provide an in-array linked list identifier pool scheme designed to allow both memory space efficiency (same as stack), O(1) operation performance and capability of O(1) allocating specific identifiers (the same as a doubly linked list) during pool state recovery. The in-array linked list identifier pool data structure and access schemes are designed for using the identifier as resource management. The illustrative embodiments offer the same memory space efficiency and allocation/release performance as a stack data structure but provide the capability of allocating a specific identifier by request in O(1) access time during pool state recovery, which cannot be offered by stack data structure.

The illustrative embodiments offer the same O(1) identifier allocation and release performance as doubly linked list data structure but do not require extra per-identifier metadata memory space for maintaining doubly linked list data structure.

The in-memory array-based linked list data structure for identifier pool scheme provides deterministic O(1) access complexity, even with allocating a specific identifier by request during pool recovery mode. The data structure allows a user specified start and end identifier values at pool creation time, such that the size (or range) of the identifier pool which is directly related to memory space can be decoupled from the size of the identifier itself. The data structure also has no need for run-time dynamic memory allocation. Rather, the array can be declared on heap.

The illustrative embodiments provide a trade-off of memory efficiency to performance. For example, with identifiers of size unit16_t, an identifier pool size of 8K will take ~16 KB memory, while an identifier pool size of 64K will take ~128 KB memory. With identifiers of size unit32_t, an identifier pool size (or range) of 8K will still take ~16 KB memory, while an identifier pool size (or range) of 64K will still take ~128 KB memory.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

FIG. 1 depicts a pictorial representation of a network of data processing systems in which illustrative embodiments can be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 may provide a set of one or more connector services for managing idempotent operations on a system of record, such as storage 108. An idempotent operation is an identical operation, which was previously performed or executed, that has the same effect as performing a single operation. Also, it should be noted that server 104 and server 106 may each represent a plurality of servers providing management of idempotent operations for a plurality of system of records.

Client 110, client 112, and client 114 also connect to network 102. Clients 110, 112, and 114 are clients of server 104 and server 106. Server 104 and server 106 may provide information, such as boot files, operating system images, and software applications to clients 110, 112, and 114.

In this example, clients 110, 112, and 114 are shown as desktop or personal computers. However, it should be noted that clients 110, 112, and 114 are intended as examples only. In other words, clients 110, 112, and 114 may include other types of data processing systems, such as, for example, network computers, laptop computers, tablet computers, handheld computers, smart phones, smart watches, personal digital assistants, gaming devices, set-top boxes, kiosks, smart tags, IoT sensors, and the like. Users of clients 110, 112, and 114 may utilize clients 110, 112, and 114 to access system of records corresponding to one or more enterprises, via the connector services provided by server 104 and server 106, to perform different data operations. The operations may be, for example, retrieve data, update data, delete data, store data, and the like, on the system of records.

Storage 108 is a network storage device capable of storing any type of data in a structured format or an unstructured format. In addition, storage 108 may represent a plurality of network storage devices. Further, storage 108 may represent a system of record, which is an authoritative data source, corresponding to an enterprise, organization, institution, agency, or similar entity. Furthermore, storage unit 108 may store other types of data, such as authentication or credential data that may include usernames, passwords, and biometric data associated with client users and system administrators, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), and a wide area network (WAN). FIG. 1 is intended as an example only, and not as an architectural limitation for the different illustrative embodiments.

Figure 2:
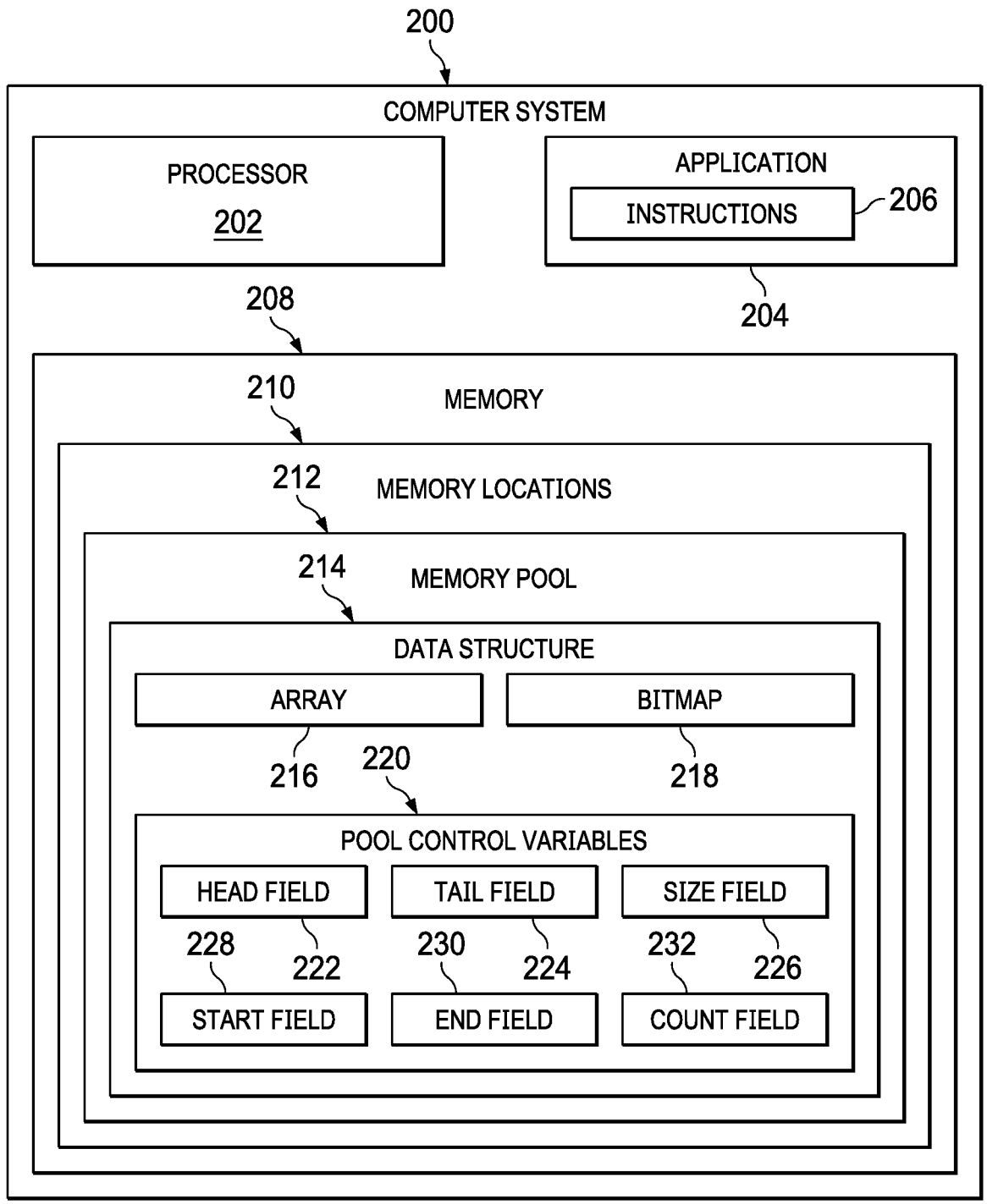
FIG. 2 is a block diagram of a computer system with an in-array linked list identifier pool data structure in accordance with an illustrative embodiment.

FIG. 2 is a block diagram of a computer system with an in-array linked list identifier pool data structure in accordance with an illustrative embodiment. Computer system 200 might be an example of servers 104, 106 or clients 110, 112, 114 in FIG. 1.

Computer system 200 comprises a processor 202 that performs instructions 206 comprising application 204. The instructions are loaded into memory 208.

Memory 208 comprises a number of memory locations 210 that can store instructions 206 of application 204. Memory 208 might comprise a memory pool 212 for dynamically allocating blocks of memory locations 210 from a region of memory 208 according to the needs of application 204.

Memory pool 212 comprises in-array linked list identifier pool data structure 214 for use by application 204. The present example uses a pool of size unit16_t (2 bytes) identifiers. However, it should be noted that the same design principal can applied to identifiers of different sizes such as, e.g., unit32_t (4 bytes) or unit64_t (8 bytes). Data structure 214 comprises array 216, bitmap 218, and pool control variables 220.

In an embodiment, array 216 comprises A[ ] of (M+1) elements, wherein the identifier value 0 is reserved as the nil identifier. The size of each element of array 216 is only related to the size of the identifier pool and is decoupled from the size of the identifiers. For example, for a pool of 255 identifiers, each of size unit16_t (2 bytes), the size of each element of array 216 can be just unit8_t (1 byte).

Bitmap 218 comprises M+1 bits, wherein each bit position corresponds to the corresponding array A[ ] element position in array 216.

Data structure 214 also comprises a number of pool control variables 220. The size of most pool control variables 220 shall be the same size as each element of array 216. For example, for pool with array 216 consists of element of size unit8_t (1 byte), most of the pool control variables will also have size of unit8_t. The only exceptions are Start field and End field, which are the same size as the identifier. Pool control variables 220 include a Head field 222 that contains the index that is on the head of the free identifier pool in-array linked list. Tail field 224 contains the index that is on the tail of the free identifier pool in-array linked list. Size field 226 contains the constant size of the identifier pool. Start field 228 contains the user specified identifier start constant. End field 230 contains the user specified identifier end constant. Count field 232 contains the available identifier count of the pool, thus (M-Count) represents the allocated or used identifiers.

The present examples assume that a pool protection mutex.Lock( ) and mutex.Unlock( ) is available and a Recovery flag indicating on-going (post-initialization) poll state recovery is in-progress, but the principles underlying the illustrative embodiments are not limited to those assumptions.

Figure 3:
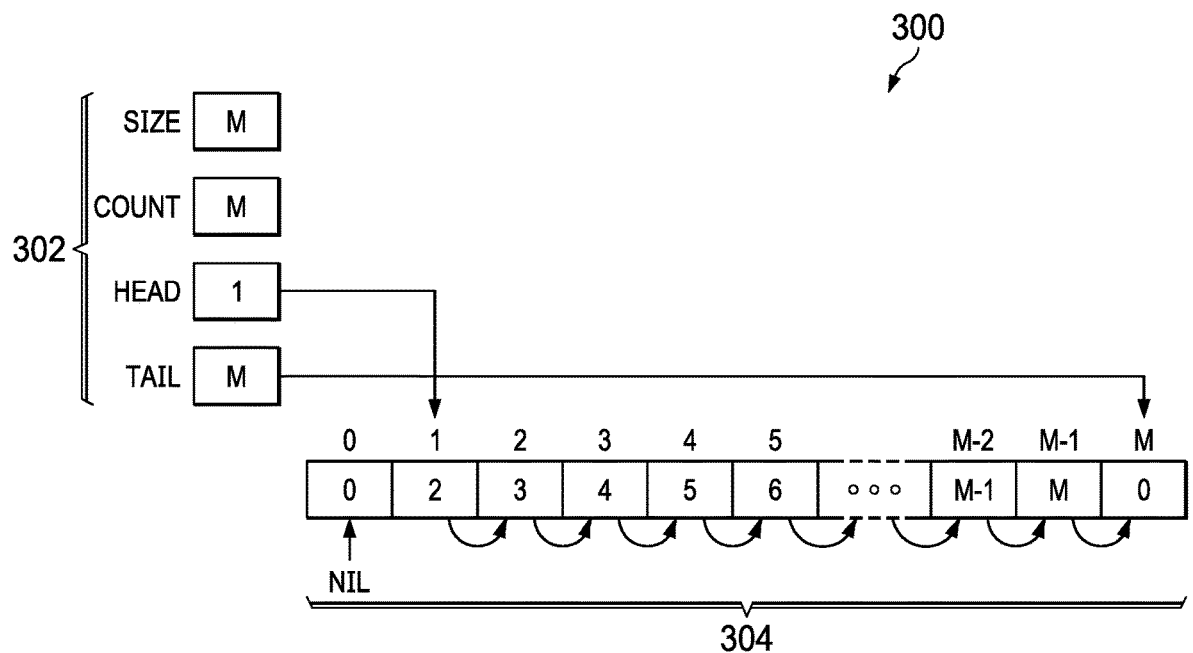
FIG. 3 illustrates in-array identifier pool initialization in accordance with an illustrative embodiment.
Figure 4:
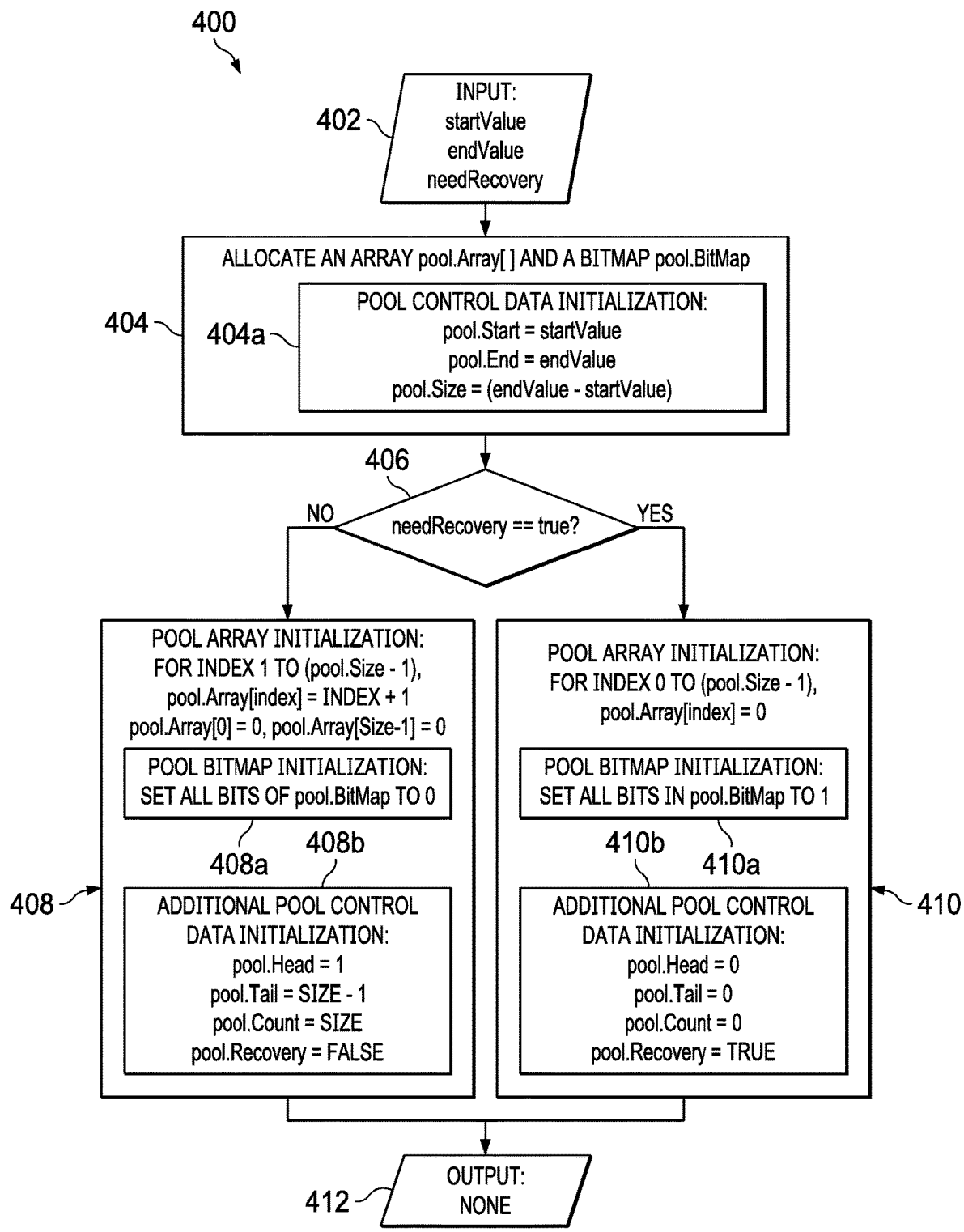
FIG. 4 depicts a flowchart illustrating a process flow for initializing an in-array identifier pool in accordance with an illustrative embodiment.

FIG. 3 illustrates in-array identifier pool initialization in accordance with an illustrative embodiment. FIG. 3 depicts an in-array linked list pool control 302, which might be an example of pool control variables 220 in FIG. 2. Similarly, pool array 304 might be an example of array 216 in FIG. 2. FIG. 4 depicts a flowchart illustrating a process flow for initializing an identifier pool in accordance with an illustrative embodiment. Process 400 might result in an output which could be an example of the initialized state 300 shown in FIG. 3.

Initialization is to set up an identifier pool in its initial state before the identifier pool can be used for managing identifier allocation and release operations. The illustrative embodiments employee two possible modes for the initialization of the identifier pool: normal initialization and recovery initialization.

Normal initialization sets the identifier pool to its pristine state, wherein all the identifiers are set as free (available) in the memory pool. Thus, the number of free identifiers in the pool is equal to the size of the pool (Size), and the available count of the pool (Count) is equal to the same value as pool Size.

Recovery initialization sets the identifier pool to its previous operation state, wherein only the identifiers that are not allocated to some other entity (e.g., allocated and used by a hardware offload engine, or used by some other software entity) are set as free in the pool. Thus, the state of the identifier pool is restored to exactly the same state before it was recovered—all the identifiers allocated and used by other entity (e.g., hardware offload engine) are not in the pool; all the identifiers not yet allocated are free in the pool.

The pool initialization is O(N) time complexity (i.e. linear time). For pool state recovery from a hardware offload engine, following SDN software restart (e.g., software upgrade), there will be additional recovery steps (explained below).

Process 400 starts with the system receiving an input of the start value and end value for the identifier pool (step 402). These values are stored in the pool control variables Start and End (404a), and a Boolean variable, needRecovery, is provided as an input flag designating if the pool will be used for a recovery operation or not.

An array is then created with the parameters based on the Start and End values read in, and a bitmap of the pool structure is created to be used in the recovery operation if needed (step 404). The size of the pool is determined by subtracting the starting value Start from the ending value End and storing that value in the pool control variable Size, and the size of the array is determined by adding one to the pool control variable Size (step 404a).

After the pool and bitmap are created, the recovery flag is evaluated to determine which type of initialization process to be executed, normal mode or recovery mode (step 406). In the first mode, there is no need to perform recovery (i.e. needRecovery==False). The pool can be created in normal mode with no need to perform recovery of pool state from hardware offline table. In the second mode, there is a need to perform recovery (i.e. needRecovery==True). In this mode, the pool is created in recovery mode, followed by pool state recovery from a hardware offline table before setting the pool for normal operation.

If a normal mode initialization is required (i.e. needRecovery==False), a software loop uses an index value and walks the array from the element position, according to the Start value, to the array element position according to the End value (step 408). Each step in the loop sets the value of the current element of the array to which the index is pointing with a value index+1, which is the index value for the next element of the array. The index value of zero (0) is reserved as nil for the in-array linked list. The first element of the array (index value 0) is set to zero (0), and the last element of the array (index value Size−1) is set to zero (0), indicating the next element is pointing to nil. All positions in the pool bitmap are set to zero (0) (step 408a). The pool control data is initialized by setting Head to value one (1), Tail to value Size, Count to value Size, and Boolean variable Recovery to false (step 408b).

If a recovery mode initialization is required (i.e. needRecovery==True), a software loop uses an index value and walks the array from the element position, according to the Start value, to the array element position according to the End value (step 410). In this mode, each step in the loop sets the value of the current array element to which the index is pointing to the value zero (0). All positions in the pool bitmap are set to one (1) (step 410a). The pool control data is initialized by setting Head to value zero (0), Tail to value zero (0), Count to value of zero (0), and Boolean variable Recovery to true (step 410b). (See FIGS. 9 and 10 for details of identifier pool recovery.)

At the end of the initialization process, no outputs are generated (step 412).

Figure 5:
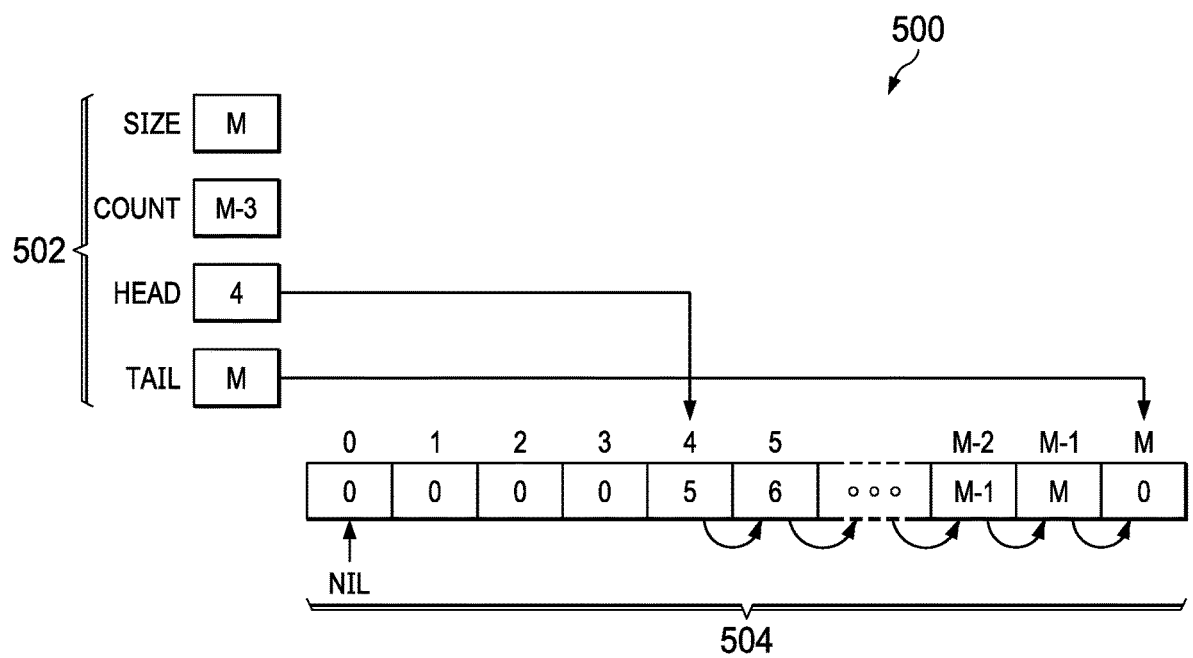
FIG. 5 illustrates identifier allocation from an in-array identifier pool in accordance with an illustrative embodiment.
Figure 6:
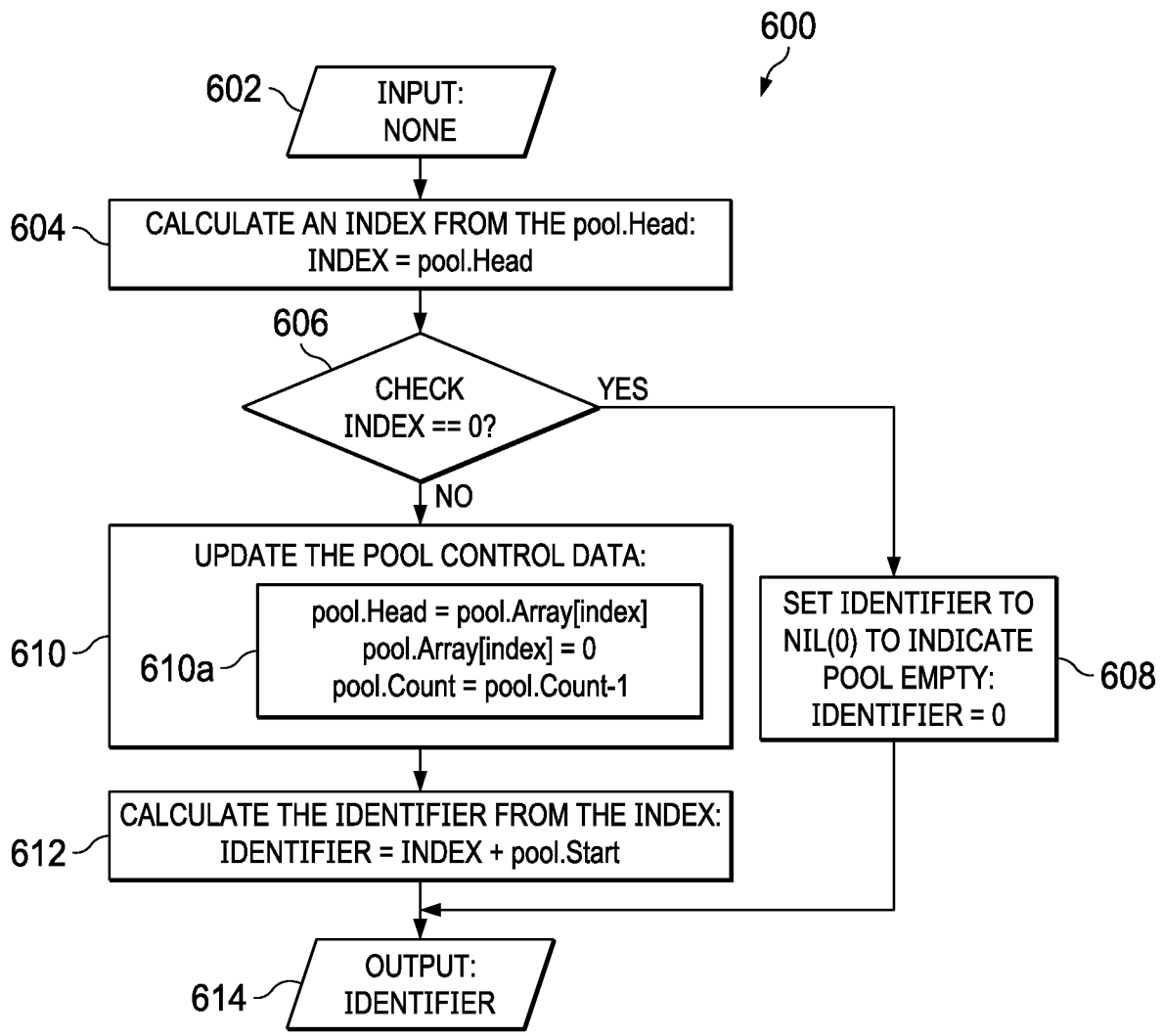
FIG. 6 depicts a flowchart illustrating a process flow for allocating an identifier within an in-array identifier pool in accordance with an illustrative embodiment.

FIG. 5 illustrates identifier allocation from an in-array identifier pool in accordance with an illustrative embodiment. FIG. 5 depicts an in-array linked list pool control 502, which might be an example of pool control variables 220 in FIG. 2. Similarly, pool array 504 might be an example of array 216 in FIG. 2. FIG. 6 depicts a flowchart illustrating a process flow for allocating an identifier from an in-array identifier pool in accordance with an illustrative embodiment. The allocation 500 shown in FIG. 5 might be an example of the resulting state of the pool after following process 600 shown in FIG. 6.

Allocation of an identifier occurs in response to a request for obtaining a free identifier from the pool. In such case, a free identifier is removed (allocated) from the pool and returned to the caller. The pool state is updated to track that the identifier has been allocated (no longer free).

Allocating a free identifier from the pool is part of normal mode of identifier pool operation. The allocation is from the Head of the in-array linked list pool control 502 and occurs in O(1) time complexity (i.e. constant time).

Allocation of a single identifier from the pool starts with no inputs to the process (step 602). Process 600 finds the next available index by starting at the beginning of the pool, setting the to be allocated index variable to equal the pool control variable Head (step 604). Next, process 600 determines if the array has no identifiers left by testing if the current value of the index variable equals zero (0) (step 606).

If the index variable does equal zero (0), there is no free identifier in the array pool, and a null/nil identifier is returned by setting identifier equal to zero (0) (step 608).

If the index variable does not equal zero (0), then there is at least one free identifier available in the identifier pool, and a single identifier is allocated (step 610). This allocation is accomplished by setting the value of Head equal to the value of the current element of the array pointed to by the index variable. The value of the current array position to which the index is pointed is then set to zero (0) to show that element is allocated. The total number of identifiers available in the pool represented by the pool control variable Count is decremented by one (1) to indicate allocation of one identifier from the array pool (step 610a).

The available identifier is returned to the calling process by setting the identifier value equal to the current value of the index added to the value of Start (identifier=index+Start) (step 612). This value represents the identifier location just selected, taking into account any offset from the start of the array created during initialization.

The value of the available identifier is then returned to the calling process (step 614).

Figure 7:
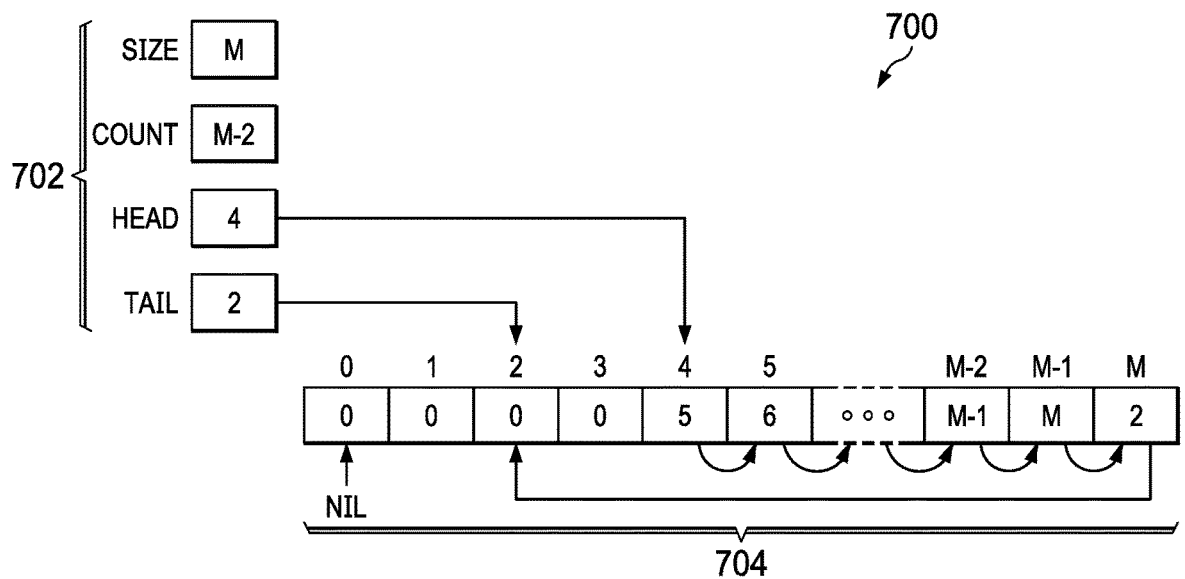
FIG. 7 illustrates release of an allocated identifier to an in-array identifier pool in accordance with an illustrative embodiment.
Figure 8:
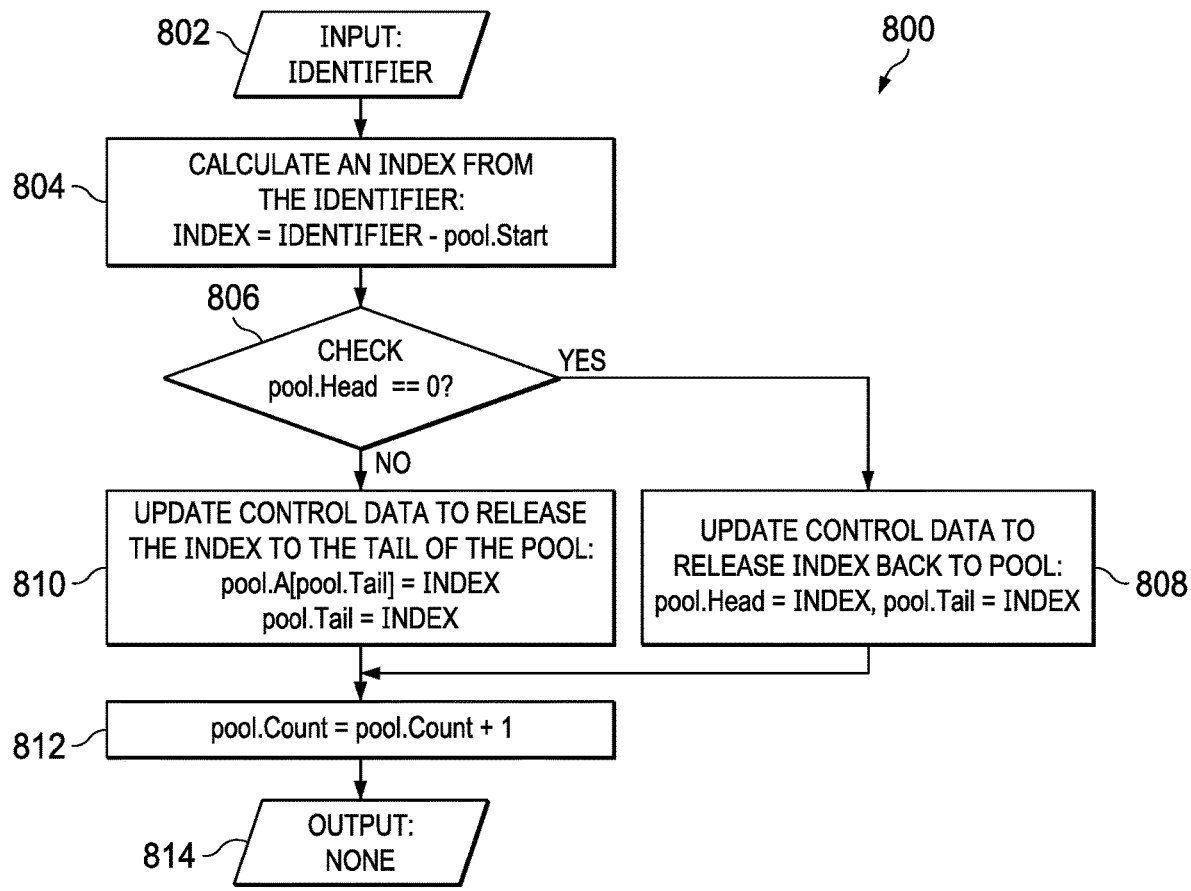
FIG. 8 depicts a flowchart illustrating a process flow for releasing an allocated identifier to an in-array identifier pool in accordance with an illustrative embodiment.

FIG. 7 illustrates release of an allocated identifier in accordance with an illustrative embodiment. FIG. 7 depicts an in-array linked list pool control 702, which might be an example of pool control variables 220 in FIG. 2. Similarly, pool array 704 might be an example of array 216 in FIG. 2. FIG. 8 depicts a flowchart illustrating a process flow for releasing an allocated identifier within an array pool in accordance with an illustrative embodiment. The identifier release 700 shown in FIG. 7 might be an example of the result of following process 800 shown in FIG. 8.

Releasing an identifier occurs in response to a request for returning a previously allocated, but no longer used, identifier back into pool. In such case, the identifier is put back (released) to the pool, and the pool state is updated to track the identifier as free (can be allocated again).

The normal identifier release 700 is performed to free an identifier back to the pool and is part of normal mode of identifier pool operation. The release is to the Tail of the in-array linked list pool via control 702 and occurs in O(1) time complexity.

Release of an identifier starts with an identifier being input (step 802). An index is then calculated from the released identifier by setting the index equal to the value of the identifier minus the value of the pool control variable Start (index=identifier−Start) (step 804).

Process 800 then determines if the array pool is empty by testing the value of the control variable Head against the value zero (0) or nil (step 806). If Head is equal to zero (0), then the pool is empty. Therefore, the released identifier becomes the only element in the in-array identifier pool, which is accomplished by setting control variable Head equal to the value of index and setting the control variable Tail equal to the value of index (step 808).

If Head is not equal to zero (0), then the pool is not empty. The released identifier is placed at the end of the in-array linked list of the identifier pool by setting the current array element pointed to by the control variable Tail equal to the value of the index and then setting Tail equal to the value of the index (step 810).

The pool control variable Count is incremented by one (1) indicating release of an identifier back into the pool (step 812).

There are no outputs returned from this process (step 814).

Figure 9:
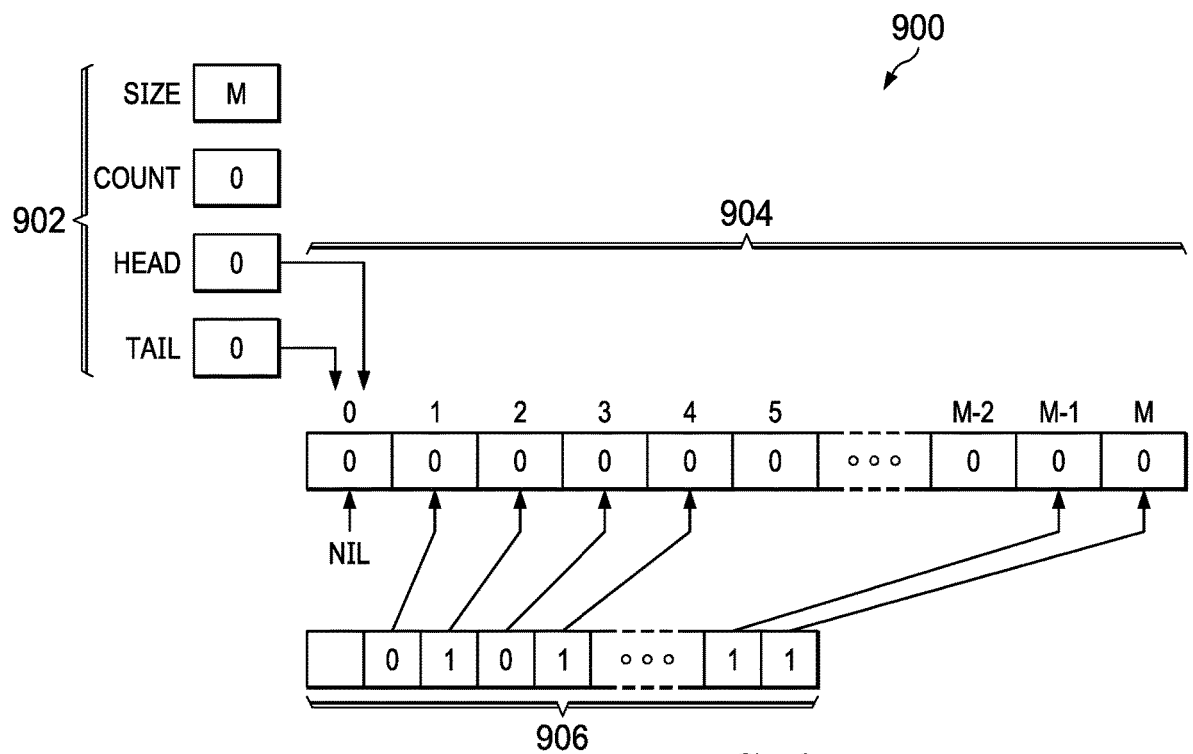
FIG. 9 illustrates recovery of an in-array identifier pool state in accordance with an illustrative embodiment.
Figure 10:
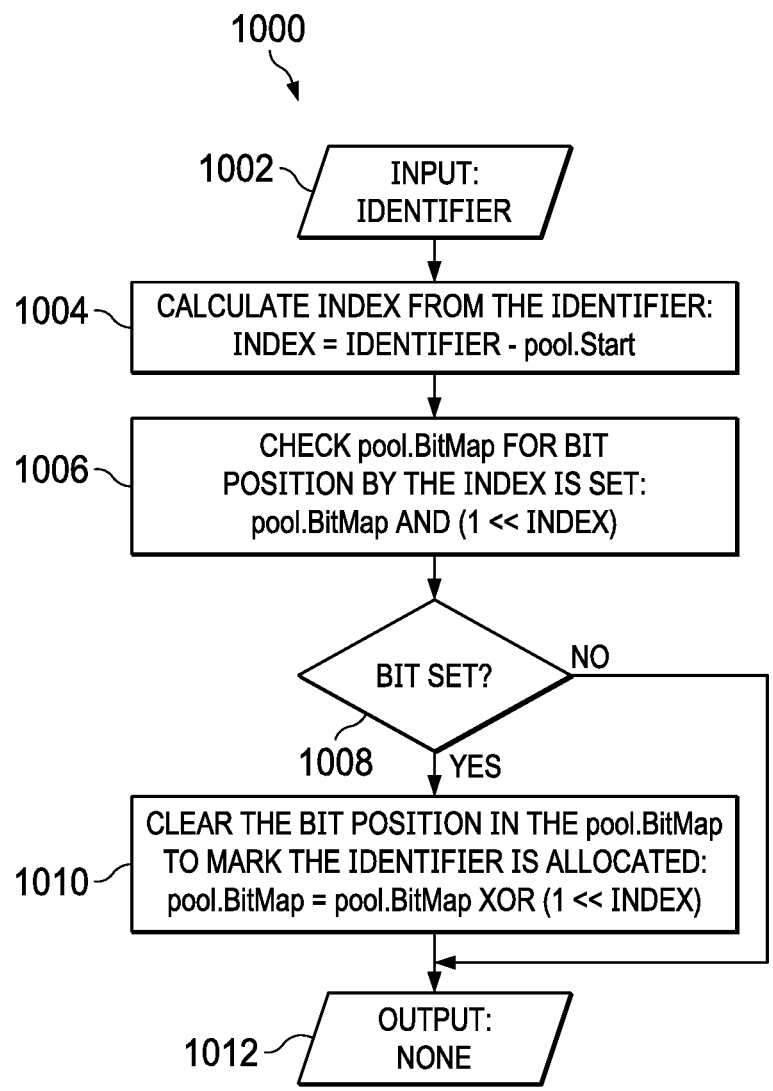
FIG. 10 depicts a flowchart illustrating a process flow for recovering the in-array identifier pool state of identifiers in accordance with an illustrative embodiment.

FIG. 9 illustrates recovery of an identifier pool state in accordance with an illustrative embodiment. FIG. 9 depicts an in-array linked list pool control 902, which might be an example of pool control variables 220 in FIG. 2. Similarly, pool array 904 might be an example of array 216 in FIG. 2. In addition to in-array linked list control variables 902 and pool array 904, recovery 900 also employs bitmap 906, which might be an example of bitmap 218 in FIG. 2. FIG. 10 depicts a flowchart illustrating a process flow for recovering the pool state of identifiers in accordance with an illustrative embodiment. The pool state recovery 900 shown in FIG. 9 might be an example of flowchart Process 1000 shown in FIG. 10.

Recovery 900 is performed to recover the pool state of identifiers based on the identifiers allocated and used in a hardware offload table following initializing the pool in recovery mode. The identifiers already allocated are iteratively read back from the hardware offload engine and then marked as "allocated" to the identifier pool in recovery mode. The performance of recovering each identifier at this stage is O(1) time complexity.

In process 1000 the system creates a recovery bitmap to record the current identifier allocation state stored in a hardware offload engine. Each identifier stored in the hardware offload engine is fed as an input to the process (step 1002). An index is calculated from the input identifier by setting the index equal to the value of identifier minus the value of pool control variable Start (index=identifier−Start) (step 1004).

The bit position by the value of the index in the bitmap is tested against the value one (1) (step 1006), and a determination is made if the bit position is set (step 1008).

If the bit is set, the index's bit position is cleared in the bitmap to show that the identifier is allocated (step 1010). If the bit is not set, or after step 1010 is completed, process 1000 ends with no outputs (step 1012).

The process 1000 shown in FIG. 10 can be performed to recover all the identifiers from the hardware offload engine.

Figure 11:
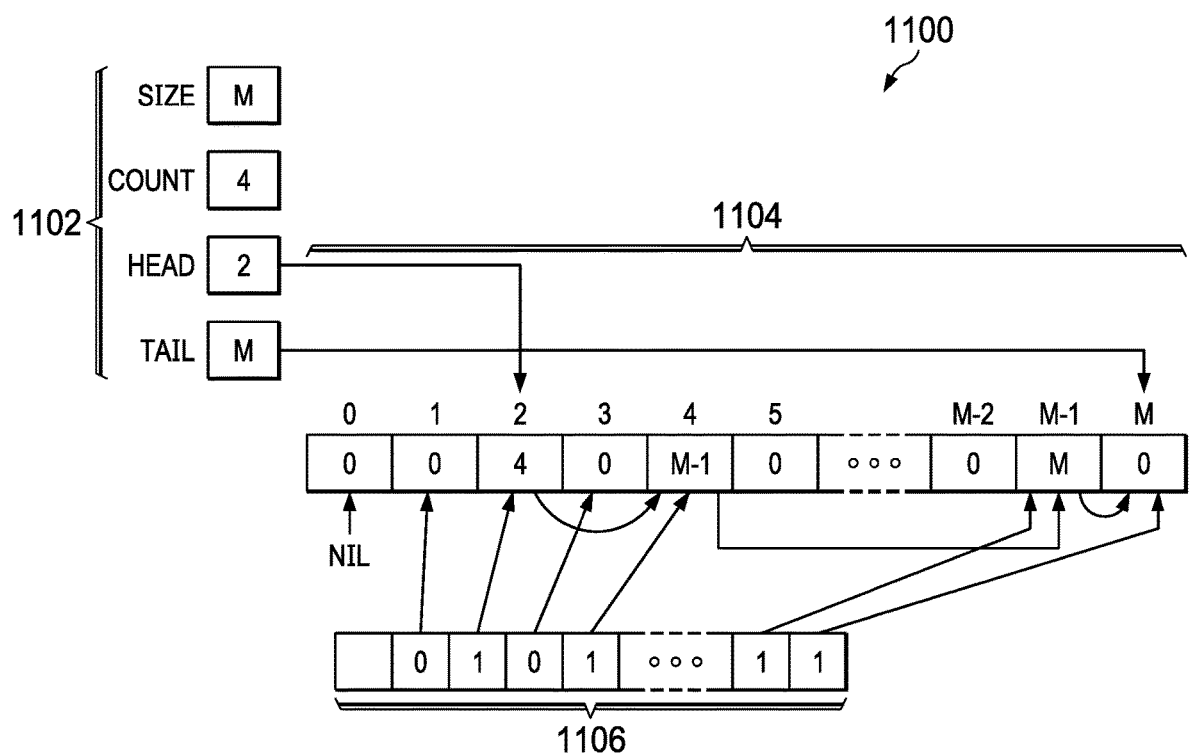
FIG. 11 illustrates restoration of identifiers to an in-array identifier pool after completion of recovery in accordance with an illustrative embodiment.
Figure 12:
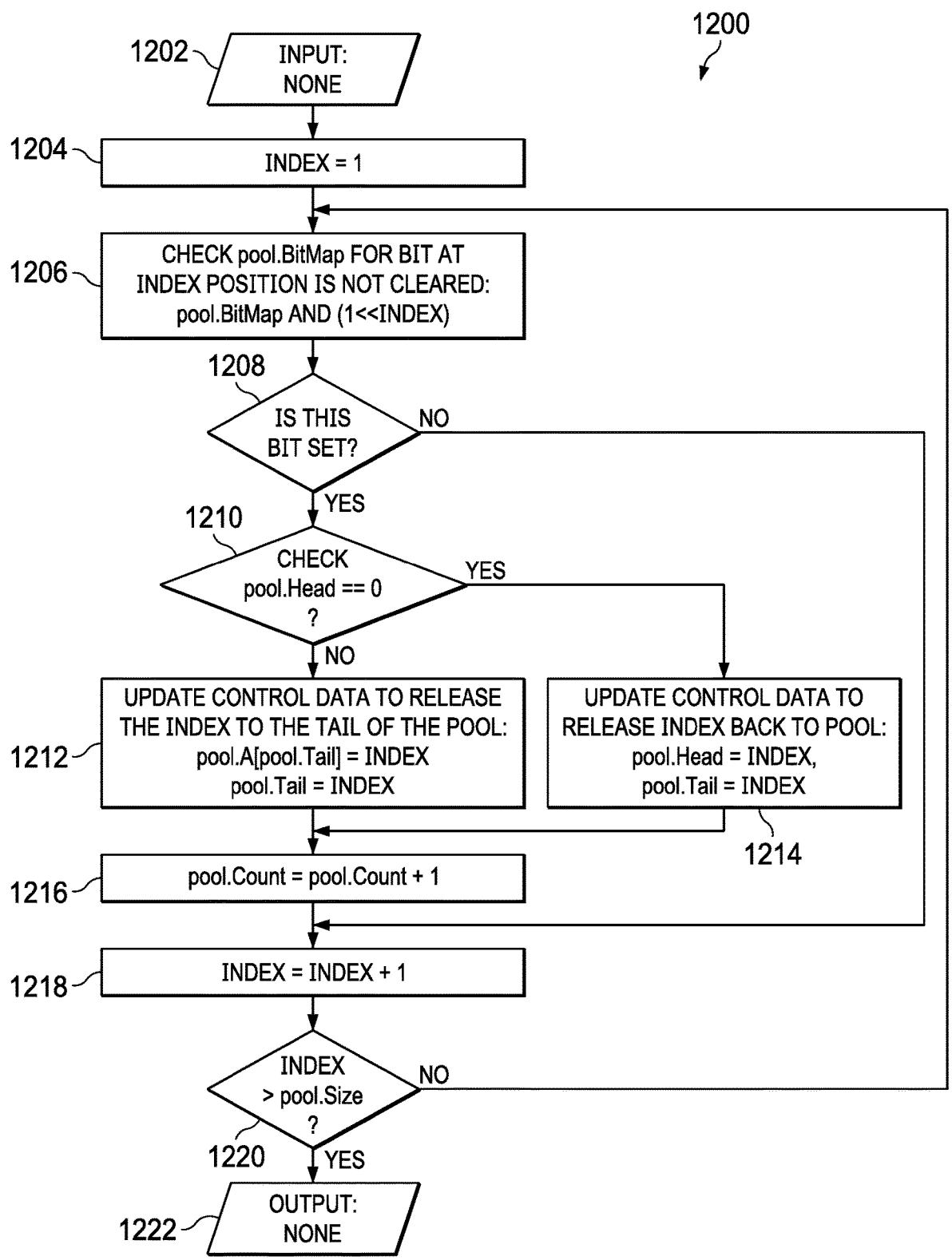
FIG. 12 depicts a flowchart illustrating a process flow for restoring identifiers to an in-array identifier pool in accordance with an illustrative embodiment.

FIG. 11 illustrates restoration of identifier pool after completion of recovery from hardware offload engine in accordance with an illustrative embodiment. FIG. 11 depicts an in-array linked list pool control 1102, which might be an example of pool control variables 220 in FIG. 2. Similarly, pool array 1104 might be an example of array 216 in FIG. 2. Bitmap 1106, which might be an example of bitmap 218 in FIG. 2. FIG. 12 depicts a flowchart illustrating a process flow for restoring identifiers to array pool in accordance with an illustrative embodiment. The restoration 1100 shown in FIG. 11 might be an example of the results after following the flowchart process 1200 shown in FIG. 12.

Restoration 1100 is called after the pool state recovery (i.e. from a hardware offload engine) is complete, the recovery bitmap 1106 built, and performs a single round of update to place the in-array pool into the recovered state. The performance of pool state restoration is in O(N) time complexity.

Once the recovery bitmap is built to mark allocated identifier locations in the array pool, the system can restore the identifiers to the array pool by using process 1200. The process needs no inputs to start (step 1202) since the array pool is initialized based on the recovery bitmap process shown in FIGS. 9 and 10 being completed first.

An iterative loop, using an index variable, begins at a value of one (1) and cycles through with each iteration by incrementing the index value by one (index=index+1) until it reaches the pool control variable value of Size (step 1204).

The array pool's bitmap is tested against the value of one (1) for the bit position indicated by the index (step 1206), and determination is made as to whether that bit position is set (step 1208). If the bit in question is not set, process 1200 increments the index variable by one (1) to indicate one more bit has been checked (step 1218), and then determines if all bit positions have been checked by testing the condition index>the pool control variable value of Size (step 1220). If all bit positions have not yet been checked, process 1200 returns to step 1206. If all bit positions (thus identifiers) have been checked, process 1200 ends with no outputs (step 1222).

If step 1208 determines the bit position is set, it indicates the index position represents a free identifier to be released back into the pool, process 1200 determines if the head of the pool equals zero (step 1210). If the head of the pool does equal zero, the control data is set to release the index back to the pool (pool.Head=index and pool.Tail=index) (step 1214). If the head of the pool does not equal zero, the control data is set to release the index to the tail of the pool (pool.A[pool.Tail]=index and pool.Tail=index) (step 1212).

After steps 1214 and 1212 process 1200 increments the pool control variable Count by one (1) to indicate one identifier has been restored back to the pool (step 1216). Process 1200 then increments the index variable by one (1) to indicate one more bit has been checked (step 1218), and tests the condition index>pool.Size to determine if all bit positions have been checked (step 1220). If all bit positions have not yet been checked, process 1200 returns to step

1206. If all bit positions and identifiers have been checked, process 1200 ends with no outputs (step 1222).

Figure 13:
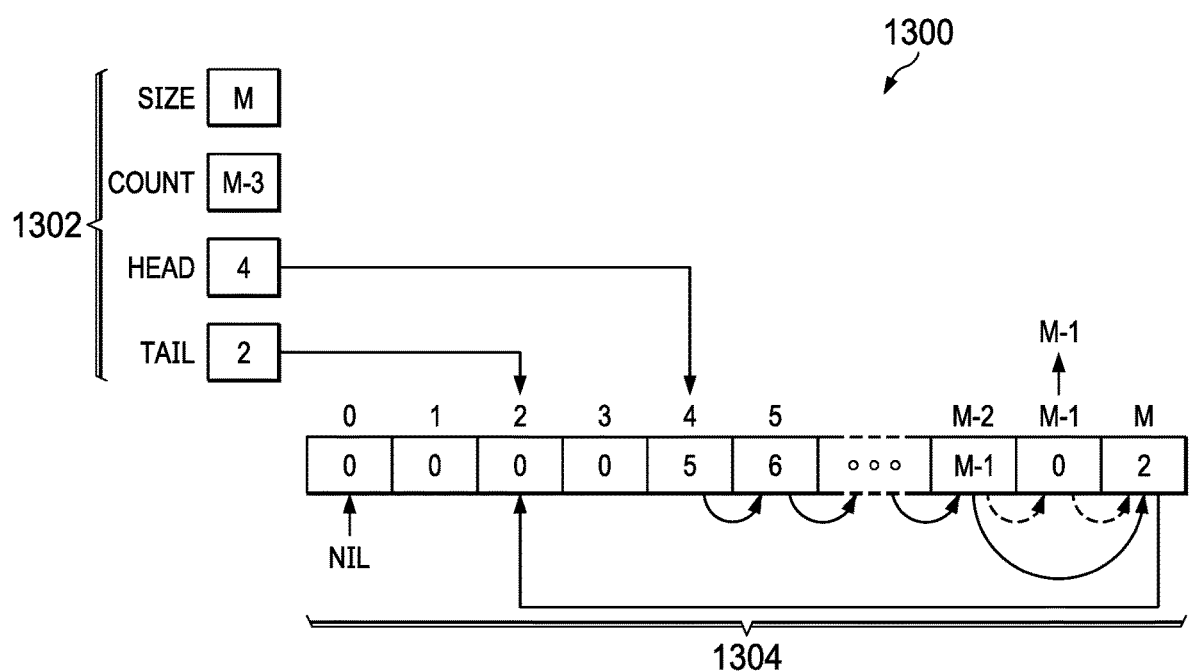
FIG. 13 illustrates allocation of a specific identifier from an in-array identifier pool in accordance with an illustrative embodiment.
Figure 14:
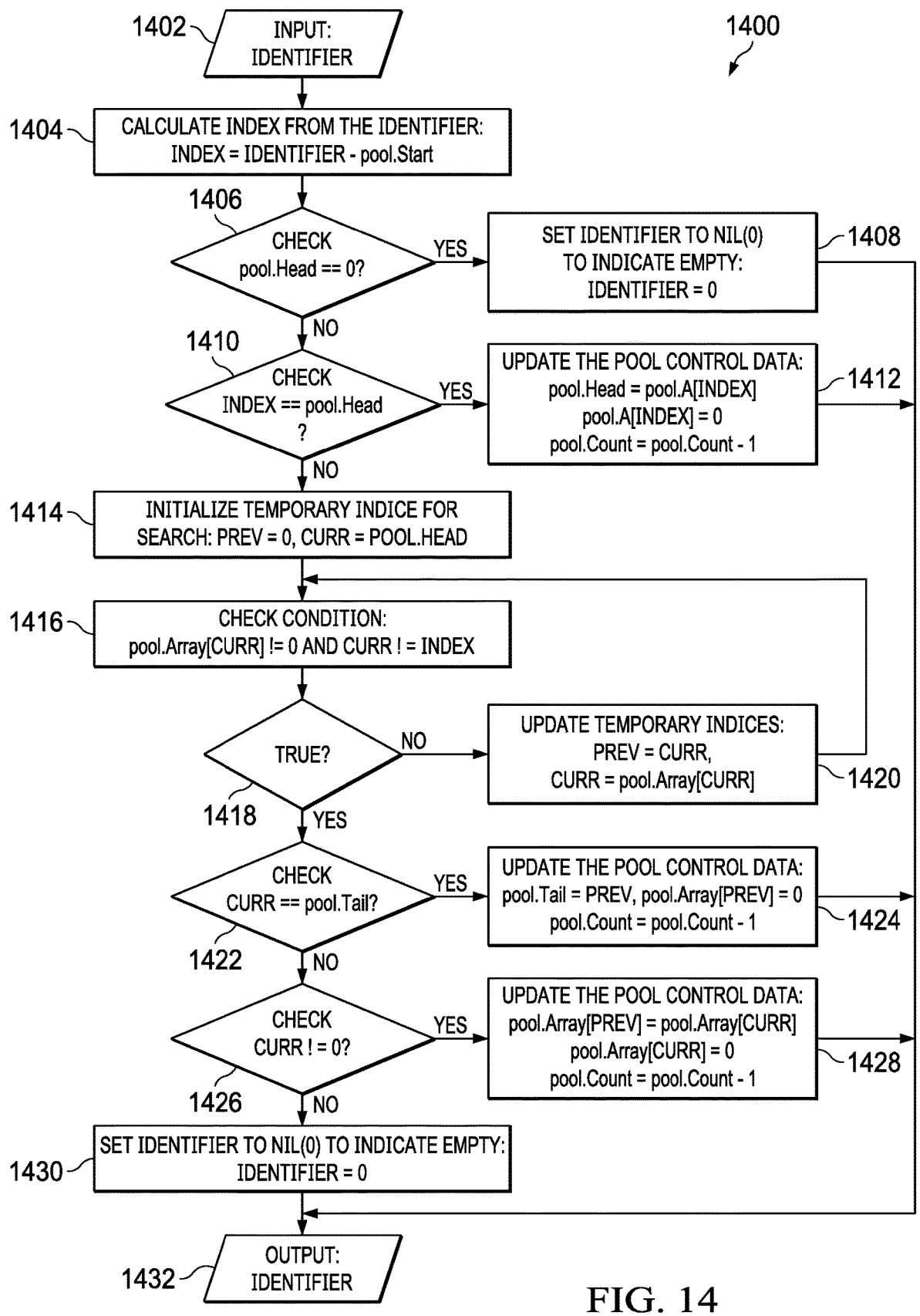
FIG. 14 depicts a flowchart illustrating a process flow for allocating a specific identifier in an in-array identifier pool in accordance with an illustrative embodiment.

FIG. 13 illustrates allocation of a specific identifier in accordance with an illustrative embodiment. FIG. 13 depicts an in-array linked list pool control 1302, which might be an example of pool control variables 220 in FIG. 2. Similarly, pool array 1304 might be an example of array 216 in FIG. 2. FIG. 14 depicts a flowchart illustrating a process flow for allocating a specific identifier from an in-array linked list pool in accordance with an illustrative embodiment. Specific identifier allocation resulting state 1300 shown in FIG. 13 might be an example of Process 1400.

Allocating a specific identifier occurs in response to a request for obtaining a specific identifier from the pool. In such a case, the calling process is not asking for just any free identifier but a specific one. The pool is searched to determine whether the requested identifier is free. If the requested identifier is free it is removed (allocated) from the pool and returned to the caller, and the pool state is updated to track that identifier has been allocated (no longer free). If the requested identifier is not free, no identifier is returned.

Allocation 1300 is performed to allocate a specific identifier from the pool in normal mode, although it is not an intended normal use of the identifier pool. The time complexity of this access is O(N).

Process 1400 begins with input of the value of an identifier (step 1402). An index is calculated from the identifier by setting the control variable index equal to the value of the identifier minus the value of pool control variable Start (index=identifier−Start) (step 1404).

To test if there are any available identifiers in the pool, the pool control variable Head is tested against the value zero (0) (step 1406). If Head is equal to zero (0), the value of the identifier is set to zero (0) to indicate that no identifier is available in the pool (step 1408). The identifier with the value of zero (0) is then returned to the calling process (step 1432).

If Head is not equal to zero (0), the value of index is tested against the value of the pool control variable Head to see if the specific identifier index being searched for is at the front of the linked list (step 1410). If Head is equal to the index, the pool control variable Head is updated to equal the array element pointed to by the index, and Count is decremented by one (1) to show one more identifier is allocated from the pool (step 1412). The identifier is marked as allocated by changing the value of the array pool element pointed to by the index to equal zero (0). The identifier is then returned to the calling process (step 1432).

If the value of index does not equal the value of Head, a search is performed through the in-array linked list pool for the index value (step 1414). Temporary index variables prev, which is set to zero (0), and curr, which is set to the value of Head, are initialized for the search process.

A search is initiated by walking through the in-array pool linked list elements and testing to see that the current array pool element being pointed to is not zero (0) and the value of curr does not equal the value of index (step 1416). As long as that condition is not true (step 1418), the process has not reached the correct index or the end of the list and needs to move forward to the next in-array linked-list pool element in the list (step 1420). The value of prev is set equal to the value of curr, and the value of curr is set to the value of the array pool element pointed to by curr.

When the search completes, the process will be in one of three states.

In state one, the index value representing the identifier requested is at the end of the array pool list indicated by the value of curr equaling the value of the pool control variable Tail (step 1422). When the index searched for is at the end of the list the pool control variable Tail is updated to equal the array element pointed to by prev, and Count is decremented by one (1) to show one more identifier is allocated from the pool (step 1424). The identifier is marked as allocated by changing the value of the array pool element pointed to by prev to equal zero (0). The identifier is then returned to the calling process (step 1432).

In state two, the index value representing the identifier requested was found somewhere in the middle of the array pool list (between Head and Tail) which is indicated by the value of curr not being equal to zero (0) when the search loop terminates (step 1426). When the index searched for is in the middle of the list the array pool element pointed to by prev is updated to equal the array pool element pointed to by curr, and Count is decremented by one (1) to indicate one more identifier is allocated from the pool (step 1428). The identifier is marked as allocated by changing the value of the array pool element pointed to by curr to equal zero (0). The identifier is then returned to the calling process (step 1432).

In state three, the index value representing the identifier requested was not found in the list at all, indicated by the search loop terminating and the value of curr is equal to zero (0) in step 1426. When this occurs, the identifier is set equal to zero (0) to indicate the identifier represented by index is not in the array pool (step 1430). The identifier is then returned to the calling process (step 1432).

Figure 15:
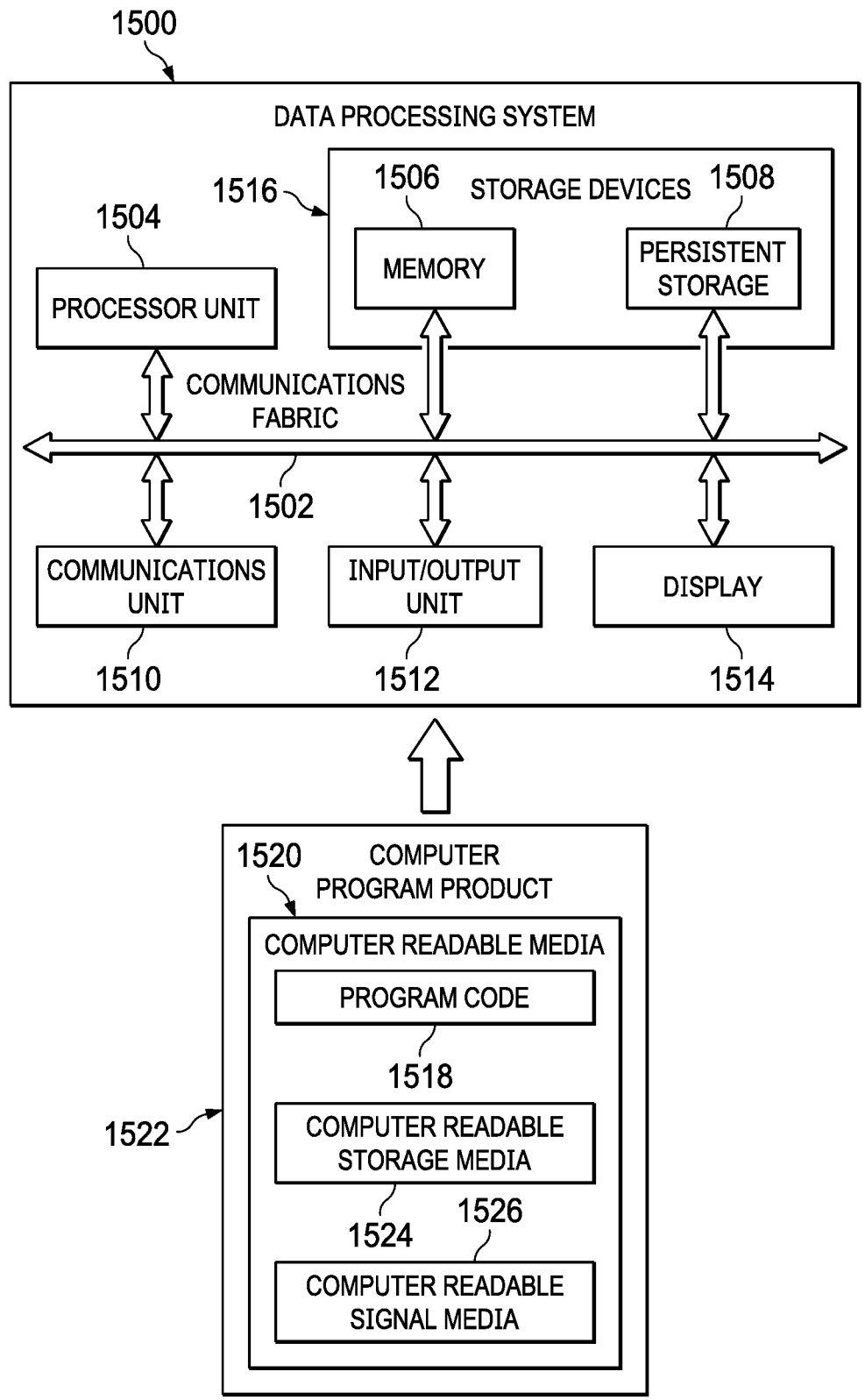
FIG. 15 is a diagram of a data processing system is depicted in accordance with an illustrative embodiment.

Turning to FIG. 15, a diagram of a data processing system is depicted in accordance with an illustrative embodiment. Data processing system 1500 is an example of a system in which computer-readable program code or program instructions implementing processes of illustrative embodiments may be run. Data processing system 1500 can also be used to implement cloud computing nodes 110 in FIG. 1. In this illustrative example, data processing system 1500 includes communications fabric 1502, which provides communications between processor unit 1504, memory 1506, persistent storage 1508, communications unit 1510, input/output unit 1512, and display 1514.

Processor unit 1504 serves to execute instructions for software applications and programs that may be loaded into memory 1506. Processor unit 1504 may be a set of one or more hardware processor devices or may be a multi-processor core, depending on the particular implementation. Further, processor unit 1504 may be implemented using one or more heterogeneous processor systems, in which a main processor is present with secondary processors on a single chip. As another illustrative example, processor unit 1504 may be a symmetric multi-processor system containing multiple processors of the same type.

A computer-readable storage device is any piece of hardware that is capable of storing information, such as, for example, without limitation, data, computer-readable program code in functional form, and/or other suitable information either on a transient basis and/or a persistent basis. Further, a computer-readable storage device excludes a propagation medium. Memory 1506, in these examples, may be, for example, a random access memory, or any other suitable volatile or non-volatile storage device. Persistent storage 1508 may take various forms, depending on the particular implementation. For example, persistent storage 1508 may contain one or more devices. For example, persistent storage 1508 may be a hard drive, a flash memory, a rewritable optical disk, a rewritable magnetic tape, or some combination of the above. The media used by persistent storage 1508 may be removable. For example, a removable hard drive may be used for persistent storage 1508.

Communications unit 1510, in this example, provides for communication with other computers, data processing systems, and devices via network. Communications unit 1510 may provide communications using both physical and wireless communications links. The physical communications link may utilize, for example, a wire, cable, universal serial bus, or any other physical technology to establish a physical communications link for data processing system 1500. The wireless communications link may utilize, for example, shortwave, high frequency, ultra-high frequency, microwave, wireless fidelity (WiFi), Bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 1500.

Input/output unit 1512 allows for the input and output of data with other devices that may be connected to data processing system 1500. For example, input/output unit 1512 may provide a connection for user input through a keypad, keyboard, and/or some other suitable input device. Display 1514 provides a mechanism to display information to a user and may include touch screen capabilities to allow the user to make on-screen selections through user interfaces or input data, for example.

Instructions for the operating system, applications, and/or programs may be located in storage devices 1516, which are in communication with processor unit 1504 through communications fabric 1502. In this illustrative example, the instructions are in a functional form on persistent storage 1508. These instructions may be loaded into memory 1506 for running by processor unit 1504. The processes of the different embodiments may be performed by processor unit 1504 using computer-implemented program instructions, which may be located in a memory, such as memory 1506. These program instructions are referred to as program code, computer-usable program code, or computer-readable program code that may be read and run by a processor in processor unit 1504. The program code, in the different embodiments, may be embodied on different physical computer-readable storage devices, such as memory 1506 or persistent storage 1508.

Program code 1518 is located in a functional form on computer-readable media 1520 that is selectively removable and may be loaded onto or transferred to data processing system 1500 for running by processor unit 1504. Program code 1518 and computer-readable media 1520 form computer program product 1522. In one example, computer-readable media 1520 may be computer-readable storage media 1524 or computer-readable signal media 1526. Computer-readable storage media 1524 may include, for example, an optical or magnetic disc that is inserted or placed into a drive or other device that is part of persistent storage 1508 for transfer onto a storage device, such as a hard drive, that is part of persistent storage 1508. Computer-readable storage media 1524 also may take the form of a persistent storage, such as a hard drive, a thumb drive, or a flash memory that is connected to data processing system 1500. In some instances, computer-readable storage media 1524 may not be removable from data processing system 1500.

Alternatively, program code 1518 may be transferred to data processing system 1500 using computer-readable signal media 1526. Computer-readable signal media 1526 may be, for example, a propagated data signal containing program code 1518. For example, computer-readable signal media 1526 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer-readable media also may take the form of non-tangible media, such as communication links or wireless transmissions containing the program code.

In some illustrative embodiments, program code 1518 may be downloaded over a network to persistent storage 1508 from another device or data processing system through computer-readable signal media 1526 for use within data processing system 1500. For instance, program code stored in a computer-readable storage media in a data processing system may be downloaded over a network from the data processing system to data processing system 1500. The data processing system providing program code 1518 may be a server computer, a client computer, or some other device capable of storing and transmitting program code 1518.

The different components illustrated for data processing system 1500 are not meant to provide architectural limitations to the manner in which different embodiments may be implemented. The different illustrative embodiments may be implemented in a data processing system including components in addition to, or in place of, those illustrated for data processing system 1500. Other components shown in FIG. 15 can be varied from the illustrative examples shown. The different embodiments may be implemented using any hardware device or system capable of executing program code. As one example, data processing system 1500 may include organic components integrated with inorganic components and/or may be comprised entirely of organic components excluding a human being. For example, a storage device may be comprised of an organic semiconductor.

As another example, a computer-readable storage device in data processing system 1500 is any hardware apparatus that may store data. Memory 1506, persistent storage 1508, and computer-readable storage media 1524 are examples of physical storage devices in a tangible form.

In another example, a bus system may be used to implement communications fabric 1502 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 1506 or a cache such as found in an interface and memory controller hub that may be present in communications fabric 1502.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Furthermore, it should be understood that embodiments discussed herein are not limited to the particular features and processing steps shown. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for identifier management in computer memory, the method comprising:
creating a memory pool array within a computer memory, wherein the memory pool array reserves a number of locations in the computer memory for use by a software application, and wherein each location in the memory pool array represents an identifier;
specifying a start identifier value and an end identifier value for the memory pool array, wherein the start identifier value specifies a starting location of the memory pool array and the end identifier value specifies an end location of the memory pool array;
initializing the memory pool array, wherein initializing comprises creating an in-array linked list pool of identifiers for use by the software application;
allocating an identifier from the memory pool array for use by the software application, wherein allocating is managed by a set of pool control variables by allocating an index from the in-array linked list pool;
determining if recovery of a state of the memory pool array is required following a software restart; and
if recovery is required, constructing a recovery bitmap by reading previously allocated identifiers from a hardware offload engine to record a current identifier allocation state stored in the hardware offload engine, wherein initializing the memory pool array comprises setting the in-array linked list pool to a previous state using the recovery bitmap of the previously allocated identifiers read from the hardware offload engine.

2. The method of claim 1, wherein the identifier is a single identifier allocated from the memory pool array responsive to a request to obtain a free identifier from the memory pool array, and further comprising:
receiving the start identifier value for the memory pool array, the end identifier value for the memory pool array, and a recovery flag indicating whether the memory pool array is to be used for the recovery.

3. The method of claim 1, wherein only identifiers that were not previously allocated to the hardware offload engine are set as free in the memory pool array.

4. The method of claim 1, further comprising:
releasing the allocated identifier back to the in-array linked list pool when the identifier is no longer needed by the software application, wherein releasing is managed by the set of pool control variables by releasing an index value for the released identifier to the in-array linked list pool by placing the released identifier at an end location of the in-array linked list pool of identifiers.

5. The method of claim 1, further comprising updating the in-array linked list pool from the recovery bitmap to include only previously non-allocated identifiers.

6. The method of claim 1, wherein the software restart is for a software defined network controller.

7. The method of claim 1, wherein the allocated identifier is a specified identifier that is specified in advance of performing the allocating of the identifier.

8. The method of claim 7, further comprising:
creating an index value representing the specified identifier; and
comparing the index value to the in-array linked list pool to determine if the specified identifier is available in the memory pool array.

9. A system for identifier management in computer memory, the system comprising:
a storage device configured to store program instructions; and
one or more processors operably connected to the storage device and configured to execute the program instructions to cause the system to:
create a memory pool array within a computer memory, wherein the memory pool array reserves a number of locations in the computer memory for use by a software application, and wherein each location in the memory pool array represents an identifier;
specify a start identifier value and an end identifier value for the memory pool array, wherein the start identifier value specifies a starting location of the memory pool array and the end identifier value specifies an end location of the memory pool array;
initialize the memory pool array, wherein initializing comprises creating an in-array linked list pool of identifiers for use by the software application;
allocate an identifier from the memory pool array for use by the software application, wherein allocating is managed by a set of pool control variables in the in-array linked list pool;
determine if recovery of a state of the memory pool array is required following a software restart; and
if recovery is required, construct a recovery bitmap by reading previously allocated identifiers from a hardware offload engine to record a current identifier allocation state stored in the hardware offload engine, wherein initializing the memory pool array comprises setting the in-array linked list pool to a previous state using the recovery bitmap of the previously allocated identifiers read from the hardware offload engine.

10. The system of claim 9, wherein the identifier is a single identifier allocated from the memory pool array responsive to a request to obtain a free identifier from the memory pool array, and wherein the processors further execute the instructions to cause the system to receive the start identifier value for the memory pool array, the end identifier value for the memory pool array, and a recovery flag indicating whether the memory pool array is to be used for the recovery.

11. The system of claim 9, wherein only identifiers that were not previously allocated to the hardware offload engine are set as free in the memory pool array.

12. The system of claim 9, wherein the processors further execute instructions to cause the system to release the allocated identifier back to the in-array linked list pool when the identifier is no longer needed by the software application, wherein releasing is managed by the set of pool control variables by releasing an index value for the released identifier to the in-array linked list pool by placing the released identifier at an end location of the in-array linked list pool of identifiers.

13. The system of claim 9, wherein the processors further execute instructions to cause the system to update the in-array linked list pool from the recovery bitmap to include only previously non-allocated identifiers.

14. The system of claim 9, wherein the software restart is for a software defined network controller.

15. The system of claim 9, wherein the allocated identifier is a specified identifier that is specified in advance of performing the allocating of the identifier.

16. The system of claim 15, wherein the processors further execute instructions to cause the system to:
   create an index value representing the specified identifier; and
   compare the index value to the in-array linked list pool to determine if the specified identifier is available in the memory pool array.

17. A computer program product for identifier management in computer memory, the computer program product comprising:
   a computer-readable storage medium having program instructions embodied thereon to perform the steps of:
      creating a memory pool array within a computer memory, wherein the memory pool array reserves a number of locations in the computer memory for use by a software application, and wherein each location in the memory pool array represents an identifier;
      specifying a start identifier value and an end identifier value for the memory pool array, wherein the start identifier value specifies a starting location of the memory pool array and the end identifier value specifies an end location of the memory pool array;
      initializing the memory pool array, wherein initializing comprises creating an in-array linked list pool of identifiers for use by the software application;
      allocating an identifier from the memory pool array for use by the software application, wherein allocating is managed by a set of pool control variables by allocating an index in the in-array linked list pool;
      determining if recovery of a state of the memory pool array is required following a software restart; and
      if recovery is required, constructing a recovery bitmap by reading previously allocated identifiers from a hardware offload engine to record a current identifier allocation state stored in the hardware offload engine, wherein initializing the memory pool array comprises setting the in-array linked list pool to a previous state using the recovery bitmap of the previously allocated identifiers read from the hardware offload engine.

18. The computer program product of claim 17, further comprising instructions for:
   releasing the allocated identifier back to the in-array linked list pool when the identifier is no longer needed by the software application, wherein releasing is managed by the set of pool control variables by releasing an index value for the released identifier to the in-array linked list pool by placing the released identifier at an end location of the in-array linked list pool of identifiers.

19. The method of claim 1, wherein each bit position in the recovery bitmap corresponds to a corresponding element position in the memory pool array.

20. The computer program product of claim 17, wherein each bit position in the recovery bitmap corresponds to a corresponding element position in the memory pool array.

* * * * *